July 8, 1969 L. G. CHERNE 3,453,869
MECHANISM FOR PRESSURE TESTING INSTALLED SEWER PIPE FOR LEAKS
Filed Feb. 15, 1967

INVENTOR.
LLOYD G. CHERNE
BY
Caswell, Lagaard & Vicks
ATTORNEYS

July 8, 1969

L. G. CHERNE

3,453,869

MECHANISM FOR PRESSURE TESTING INSTALLED SEWER PIPE FOR LEAKS

Filed Feb. 15, 1967

INVENTOR.
LLOYD G. CHERNE
BY
Caswell, Lagaard & Hicks
ATTORNEYS

INVENTOR.
LLOYD G. CHERNE
BY
Caswell, Legaard & Hicks
ATTORNEYS

July 8, 1969 L. G. CHERNE 3,453,869
MECHANISM FOR PRESSURE TESTING INSTALLED SEWER PIPE FOR LEAKS
Filed Feb. 15, 1967

INVENTOR.
LLOYD G. CHERNE
BY
Caswell, Legaard & Hicks
ATTORNEYS

INVENTOR.
LLOYD G. CHERNE
BY
Caswell, Lagaard & Wicks
ATTORNEYS

United States Patent Office 3,453,869
Patented July 8, 1969

3,453,869
MECHANISM FOR PRESSURE TESTING
INSTALLED SEWER PIPE FOR LEAKS
Lloyd G. Cherne, Minneapolis, Minn., assignor to Cherne
Industrial, Inc., Hopkins, Minn.
Filed Feb. 15, 1967, Ser. No. 622,382
Int. Cl. G01m 3/08
U.S. Cl. 73—40.5                              6 Claims

ABSTRACT OF THE DISCLOSURE

A device is provided for pressure testing sections of installed sewer pipe. The section to be tested is sealed off by two hollow, inflatable ball members. Tubing is provided connecting the interior of the balls to inflate them to seal off the pipe section to be tested. Separate conduits extend from the section to be tested through one of the hollow ball members. One of these conduits is connected to means to pressurize the test section, and the other conduit is connected to means to read the pressure existing in the test section.

---

The invention relates to pressure testing devices in general and more particularly to a device for pressure testing installed sewer pipes for leaks.

It is an object of the invention to provide a pair of inflatable hollow ball members which are positioned in spaced relation within a length of sewer pipe together with means for inflating the balls to seal off the sewer pipe between the balls and means for pressurizing the sewer pipe between the ball members. It is a further object to provide means for testing the pressurized pipe and noting any drop in pressure and the rate thereof.

In more detail, it is an additional object to provide a first and second reel, said first reel having a supply of cable wound thereon, said second reel having a supply of a three line air tubing wound thereon. The three line air tubing provides a first tube for inflating the balls, a second tube for pressurizing the pipe between the balls and a third tube for measuring the pressure in the sewer pipe and any fall off thereof. It is an additional object to provide means for supplying air pressure to two of said air lines and communication with the third line through the hub of the second reel while the reel is static or rotated.

It is still a further object to provide a guide member for directing the air tubes downwardly into a manhole leading to the sewer pipe being tested. It is also an object to provide a jack member for directing the air tubes from the lower end of the manhole to the sewer pipe.

It is also a further additional object to provide a device for pressure testing installed sewer pipe in extended lengths and if a leak is indicated, for testing segments of the pipe to locate the leak.

It is still a further object to provide a dual reel including first and second reel portions for carrying a supply of a first line on one reel portion and a supply of a second line on the other reel portion for pay off or takeup of the lines at different revolutions for minute and still maintain line tension, the difference in reel portion revolutions being due to a change in the diameters of the line supply on each of the reels.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of examples preferred embodiments of the invention idea wherein like numerals refer to like parts throughout.

In the drawings forming part of this application:

FIGURE 23 is a top plan view of a further embodiment of the pulley mount shown in FIGURES 17–19a.

Referring to the drawings in detail, the mechanism A includes the first inflatable ball member 26. The ball 26 includes the hollow conical-shaped first end member 28 and threadedly engaged with the apex thereof is the bolt 30. The bolt 30 extends inwardly of the end member and in threaded engagement with the end of the axial support rod 32 thereby mounting the first end member on the rod. Further provided is the hollow conical-shaped second end member 34 and threadedly engaged with the apex thereof is the bolt 36. The bolt 36 extends inwardly of the end member 34 and in threaded engagement with the end of the support rod 32, thereby mounting the second end member on the rod 32 in spaced axial alignment with the first end member 28.

The end member 28 has a continuous unbroken surface while the end member 34 is formed with the single inlet orifice 38 used to pressurize the ball 26 as hereinafter described. The end members 28 and 34 are connected at the bases thereof in sealing engagement with the flexible expandable cylindrical wall 40 which is molded of an elastomer upon the end members 28 and 34 which extends inwardly of and upon the end members and upon the rod 32 as at 41 and 42. The outer surface of the wall 40 is formed with the annular ribs 43 to provide additional positive sealing engagement of the ball with the inner surface of a sewer pipe such as S.

The numeral 44 designates a second inflatable ball member. The ball 44 is similar to ball 26 and includes the hollow conical-shaped first end member 46 and threadedly engaged with the apex thereof is the bolt 48. The bolt 48 extends inwardly of the end member and in threaded engagement with the end of the axial support rod 50 thereby mounting the first end member on the rod 50. Also provided is the hollow conical-shaped second end member 51 and threadedly engaged with the apex thereof is the bolt 52. The bolt 52 extends inwardly of the end member 51 and in threaded engagement with the end of the support rod 50 thereby mounting the second end member on the rod 50 in spaced axial alignment with the first end member 46. The ball end member 46 is formed with the orifice 54 which is connected with the orifice 38 of ball 26 by means of the length of tubing 56 whereby the ball 26 may be inflated from air pressure of ball 44 as hereinafter set forth.

The end member 46 is also formed with the opening 57 used in pressurizing a length of sewer pipe between the inflated balls 26 and 44 as hereinafter set forth. The end member 46 is further formed with the opening 58 for between the inflated balls as hereinafter set forth.

The head of the bolt 36 of ball 26 is formed with the ring 37 and the bolt 48 of ball 44 is formed with the ring 49. The two rings 37 and 49 are joined with the length of cable 60. With the cable 60 the two balls 26 and 44 may be drawn together in spaced reaction through a sewer pipe such as S by means of the cable C secured to ring 61 connected to the head of bolt 30 of ball 26.

The end member 51 of ball 44 has formed therethrough the openings 59, 62 and 64. The opening 59 has connected thereto the air supply hose 63 and air from hose 63 inflates ball 44 directly and ball 26 is inflated indirectly through the tubing 56. The opening 62 has connected thereto the air supply hose 66 and connecting opening 62 with opening 57 is the conduit 68 whereby air from hose 66 is directed out opening 57 to build up air pressure in a sewer line between the balls 26 and 44 when in expanded condition in the sewer line. The opening 64 has connected thereto the line 72 and connecting opening 64 with opening 58 is conduit 73 whereby air pressure is a sewer line between the balls 26 and 44 may be read on a pressure gauge connected to line 72 hereinafter described.

The end members 46 and 51 are connected at the bases thereof in sealing engagement with the flexible expandable cylindrical wall 74 which is molded of an elastomer upon the end members 46 and 51 and which extends inwardly of and upon the end members and upon the rod 50 and conduits 68 and 73 as at 75 and 76, respectively. The outer surface of the wall 74 is formed with the annular ribs 77 to provide additional positive sealing engagement of the ball with the inner surface of a sewer pipe such as S. Secured to the head of bolt 52 is the ring 78 to which is attached the supply cable CC hereinafter referred to.

SUPPLY REELS FOR AIR LINES AND CABLE

The three lines 63, 66 and 72, except for the end portions at the ball 44, are joined together as a multiple hose unit, and the multiple hose supply is wound on the reel R which is mounted in tandem with reel RR on which is wound the supply cable CC. The details of the reels follows. The reel R includes the first circular end wall 80 to which is axially connected the drum portion 82. The end wall 80 is connected to the axial sleeve 84 which is rotatably mounted on the stationary hub 86. The sleeve 84 includes a first inlet hole 88 to which is connected line 63, a second inlet hole 90 to which is connected line 66 and a third inlet hole 92 to which is connected line 72, particularly FIGURES 11–14. The sleeve 84 is held in position on the hub 86 by means of the rings 94 and 96.

The hub 86 has formed therein the annular spaced grooves 98, 100, 102 and 104, and in each groove is an O-ring 106. Also formed in the hub 86 is the annular recess 108 which is in radial alignment and in communication with inlet hole 88, the annular recess 110 which is in radial alignment and in communication with inlet hole 90, and the annular recess 112 which is in radial alignment and in communication with inlet hole 92.

The hub 86 is also formed with the internal longitudinally extending air hole 114 to which is connected at the outer end the air line 72a, and the inner end of the hole 114 has extending radially therefrom the short hole 116 which communicates with annular recess 112, FIGURES 11–15 in particular.

The hub 86 also includes the internal longitudinally extending air hole 118 to which is connected at the outer end the air line 66a, and the inner end of the hole 118 has extending radially therefrom the short hole 120 which communicates with the annular recess 110.

The hub 86 further includes the internal longitudinally extending air hole 122 to which is connected at the outer end the air line 63a, and the inner end of the hole 122 has extending radially therefrom the short hole 124 which communicates with annular recess 108, FIGURES 11–15 in particular.

Figure 10:
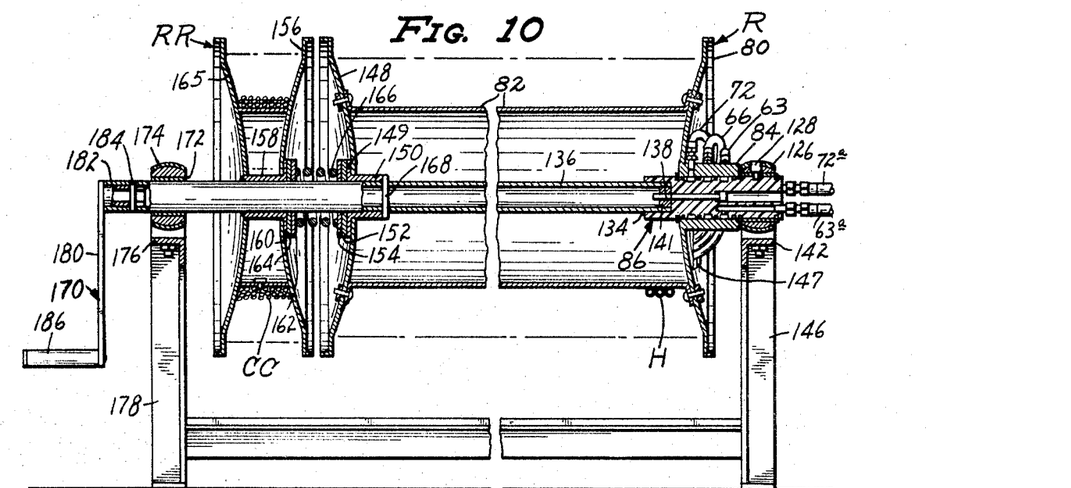
FIGURE 10 is a longitudinal side elevational view of the reel portions of which are in section on the line 10—10 of FIGURE 3.
Figures 11, 12, 13, 14:
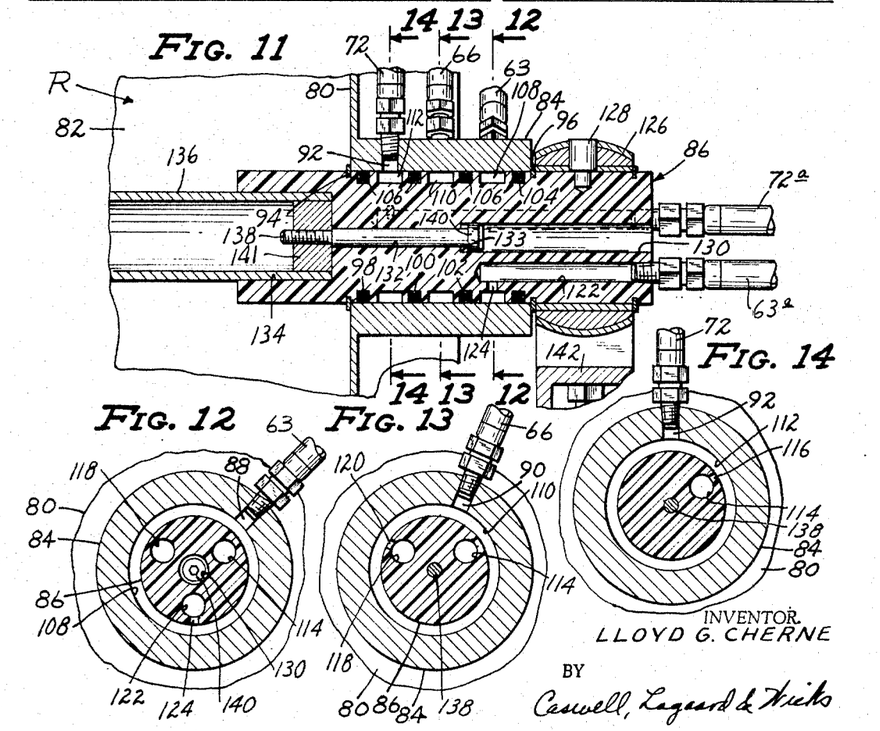
FIGURE 11 is as ectional view on the line 11—11 of FIGURE 3 showing the reel hub and a portion of the reel and the shaft therefor.
FIGURE 12 is a sectional view on the line 12—12 of FIGURE 11.
FIGURE 13 is a sectional view on the line 13—13 of FIGURE 11.
FIGURE 14 is a sectional view on the line 14—14 of FIGURE 11.

The hub 86 is mounted in the bracket 126 and secured against rotation therein by the pin 128 which extends through the upper portion of the bracket and into a hole formed in the hub 86. The hub 86 also includes the axial hole 130 extending thereinto at the outer end which terminates in the reduced diameter hole 132, thereby producing shoulder 133. The hub 86 further includes the bearing hole 134 extending into the inner end thereof and in which the end of the hollow reel shaft 136 rotates. The shaft 136 is held in position in the bearing hole 134 by means of the pin 138, the head 140 of which bears against the shoulder 133 and the inner end of which is threadedly engaged with the plug 141 fixed in the inner end of the hollow reel shaft 136, particularly FIGURES 10 and 11. It will be seen that the pin 138 rotates in the hole 132 with shaft 136.

The bracket 126 is mounted on the platform portion 142 of the supporting legs 144 and 146.

It will be seen that there is communication between line 72a and line 72 via hole 114, short hole 116, annular recess 112, and third inlet hole 92. There is also communication between line 66a and line 66 via hole 118, short hole 120, annular recess 110 and second inlet hole 90, and there is communication between line 63a and line 63 via hole 122, short hole 124, annular recess 108 and first inlet hole 88. Lines 63a, 66a and 72a are connected to the panel PP as hereinafter set forth, and it will be seen that the sleeve 84 and the hub 86 form a new and novel rotary air union between the stationary control lines 63a, 66a and 72a and the rotating supply lines 63, 66 and 72 whereby the multiple hose H may be wound upon and unwound from the reel R while in communication with the stationary lines 63a, 66a and 72a. The hoses 63, 66 and 72 pass through an opening 147 formed in reel wall 80.

The numeral 148 designates a second circular end wall secured at its center upon the annular flange 149 of the bearing 150 which rotates upon the shaft 136. Further provided is the friction ring 152 interposed between the flange 149 and the washer 154 on the shaft 136. The reel RR includes the first circular end wall 156 secured axially on the sleeve 158 which is secured to the shaft 136 against rotation and axial movement thereon. The sleeve 158 has formed thereon the annular flange 160 and interposed between the flange 160 and the washer 162 is the friction ring 164. The reel RR further includes the second circular end wall 165 and interposed between the washer 154 and the washer 162 is the coil spring 166 mounted on the shaft 136. Further provided is the pin 168 which is positioned transversely of the shaft in holes formed through the shaft and so positioned that it forces the washer 154 against spring 166 to compress the same against washer 162 which is fixed due to the fact that sleeve 158 and flange 160 thereof are fixed on shaft 136. Flange 160, spring 166 and flange 149 provide a slip drive for reel R. Thus as shaft 136 is rotated by crank handle 170 both reels are rotated but the spring and construction described allows a slippage between reel RR and reel R if resistance is met on one reel by a difference in linear draw off or wind up of hose versus cable of one reel compared to the other reel. With this dual reel construction an even tension between cable and hose is maintained irrespective of the change in wound diameters of hose and cable during use.

The end of the shaft 136 is rotatably mounted in the bearing 172 mounted in the bracket 174 secured to the platform portion 176 of the pair of supporting legs, 178. The crank handle 170 includes the arm 180 connected at one end to the short tubular portion 182 which is positioned within the outer end of the shaft 136 and secured by means of the pin 184. The arm 180 terminates in the handle portion 186. Thus as the crank 170 is operated, both the reels R and RR are rotated with the shaft 136 by means of the bearing 172 and the rotation of sleeve 84 upon hub 86.

Figure 1:
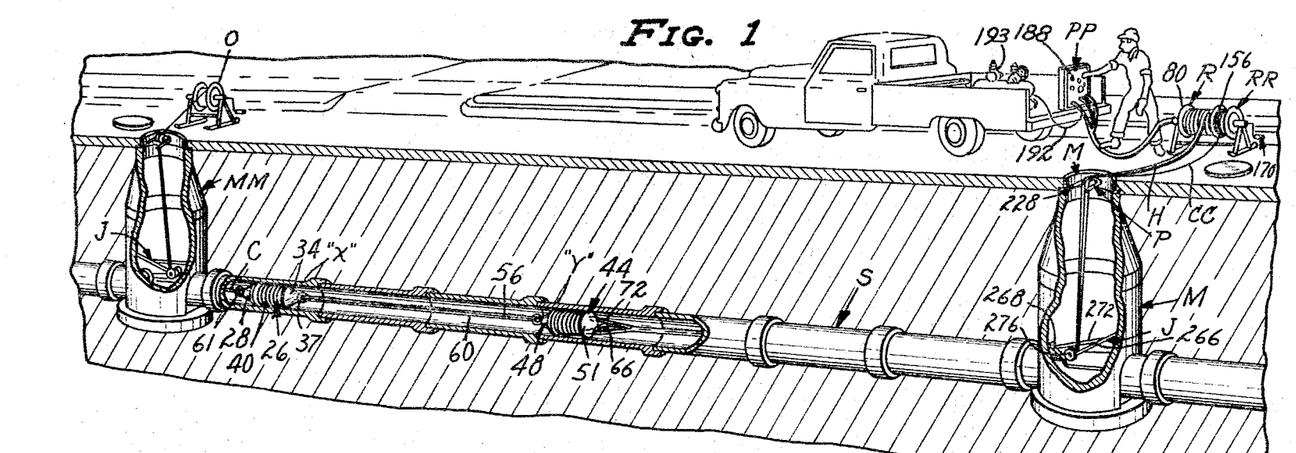
FIGURE 1 is a perspective view of the device embodying the invention in operative condition in connection with a sewer pipe.
Figure 2:
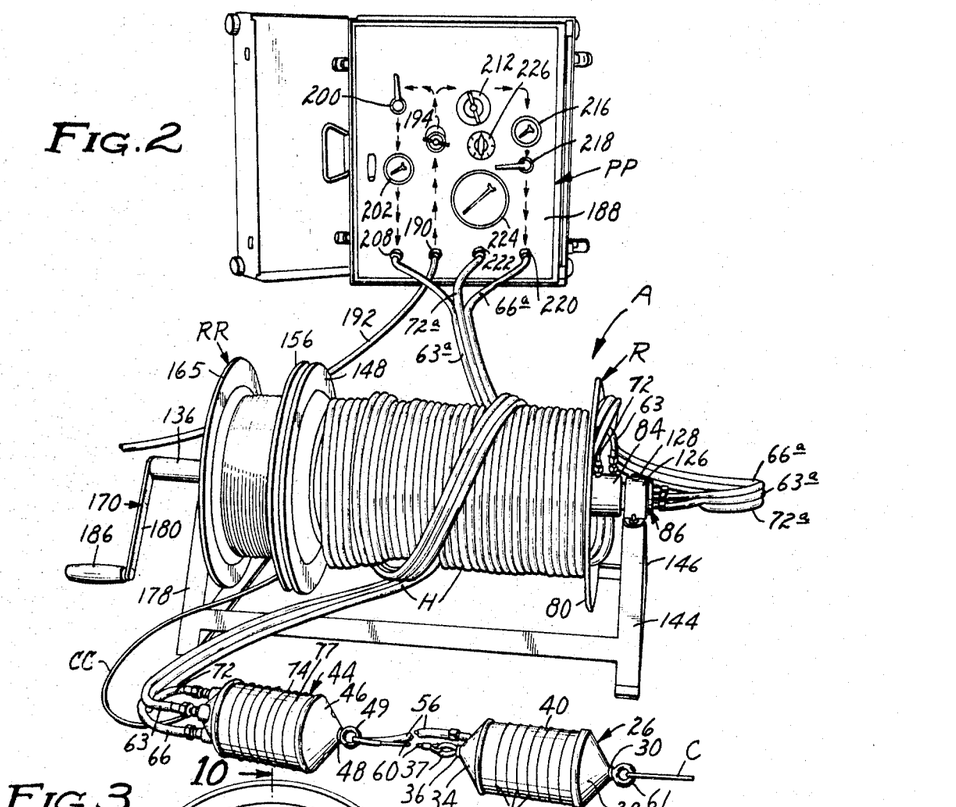
FIGURE 2 is a perspective view of the device including the ball members, the dual reel, the air supply tubes and the pressure panel.
Figures 3, 15:
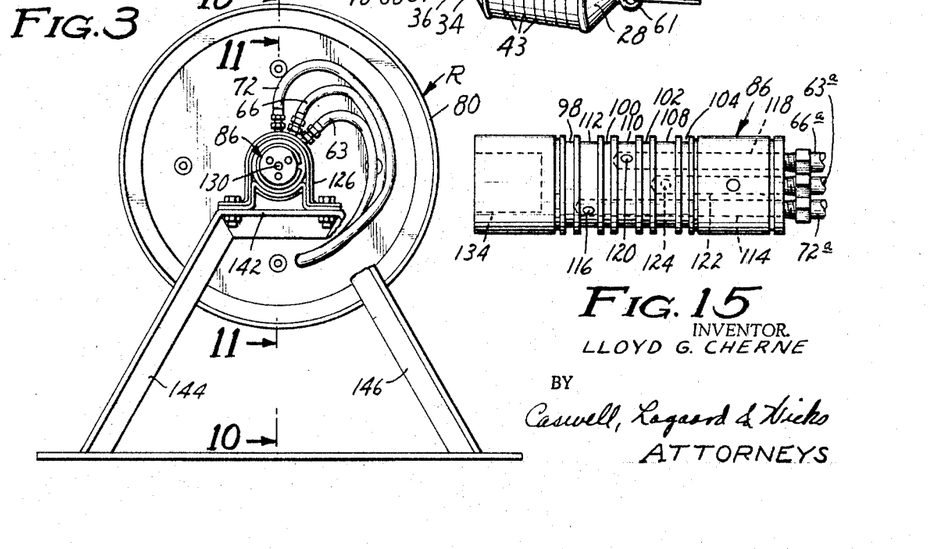
FIGURE 3 is a rear end view of the reel including the air tube connections.
FIGURE 15 is a longitudinal side elevation of the reel hub.
Figure 16:
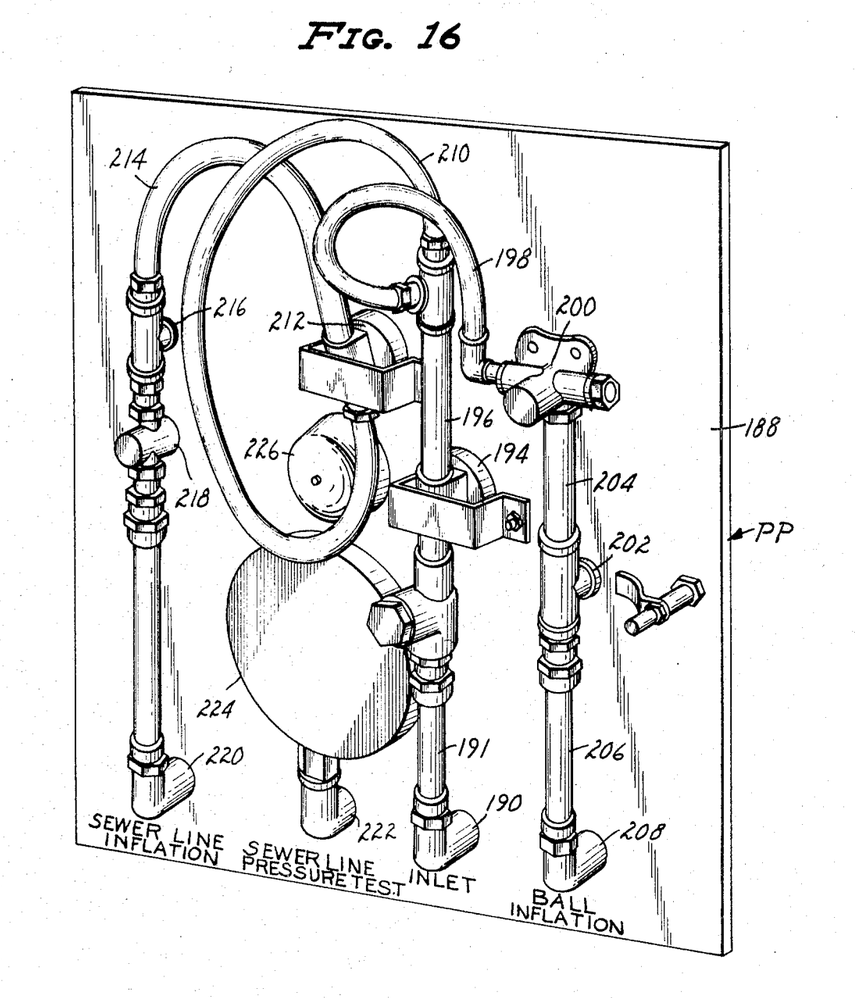
FIGURE 16 is a rear view of the control panel shown in FIGURE 2.

The control panel PP includes the board 188, FIGURES 1, 2 and 16, which includes the main air inlet connection 190 to which is connected the air supply hose 192 leading from a conventional source of supply 193 shown in FIGURE 1. The air inlet connection 190 is connected to the line portion 191 which in turn is connected to the pressure regulator valve 194 mounted on the back of the board, FIGURE 16. Connected to the regulator valve 194 is the line portion 196 to which is connected the take-off line portion 198 connected to the valve 200. The valve 200 is connected to the air gauge 202 by means of the line 204, FIGURES 2 and 16. Leading from the air gauge 202 is the line 206 connected to the air outlet 208 for inflation of the balls by means of the hose line portions 63 and 63a, FIGURES 2, 6 and 16 in particular.

The numeral 210 designates a line take-off from pressurized line portion 196 which is connected to pressure regulator 212, FIGURES 2 and 16. Leading from pressure regulator 212 is air line 214 connected to air gauge 216 which in turn is connected to air valve 218 which in turn is connected to air outlet 220 for inflation or pressurizing of the sewer pipe by means of line portions 66 and 66a.

Further provided is the inlet connection 222 to which is connected the line 72a which is in communication with line 72 as hereinbefore described, the line 72 connected to opening 64 of ball 44 whereby the pressure in the sewer pipe between the inflated balls may be read through opening 58 and conduit 73 leading to line 72 on pressure gauge 224. Also included in the panel is the mechanical timer 226 for use in timing the drop in pressure, if any, in the pressurized sewer pipe S as further described hereinafter.

Figure 17:
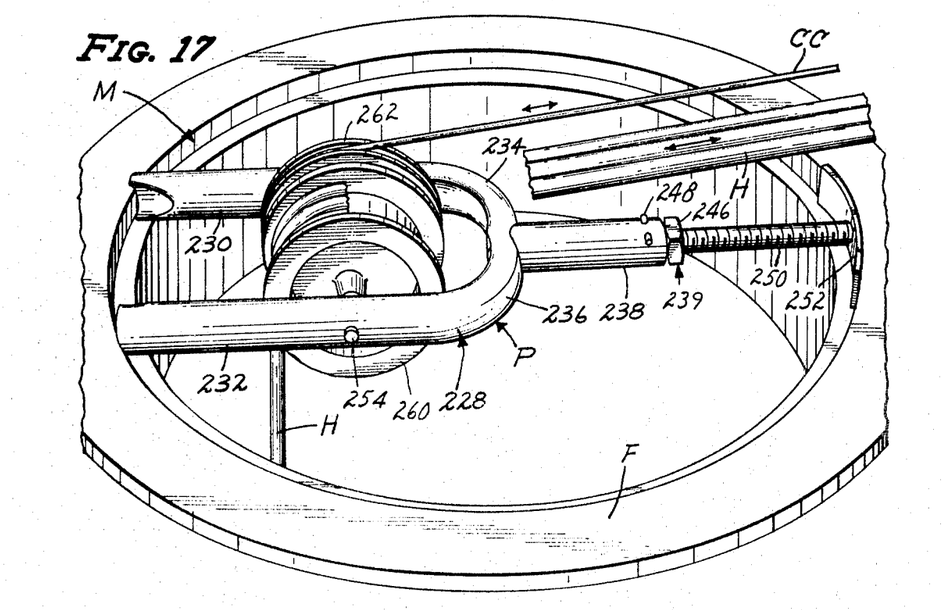
FIGURE 17 is a perspective view of a pulley mount for a manhole opening.
Figures 18, 19, 19A:
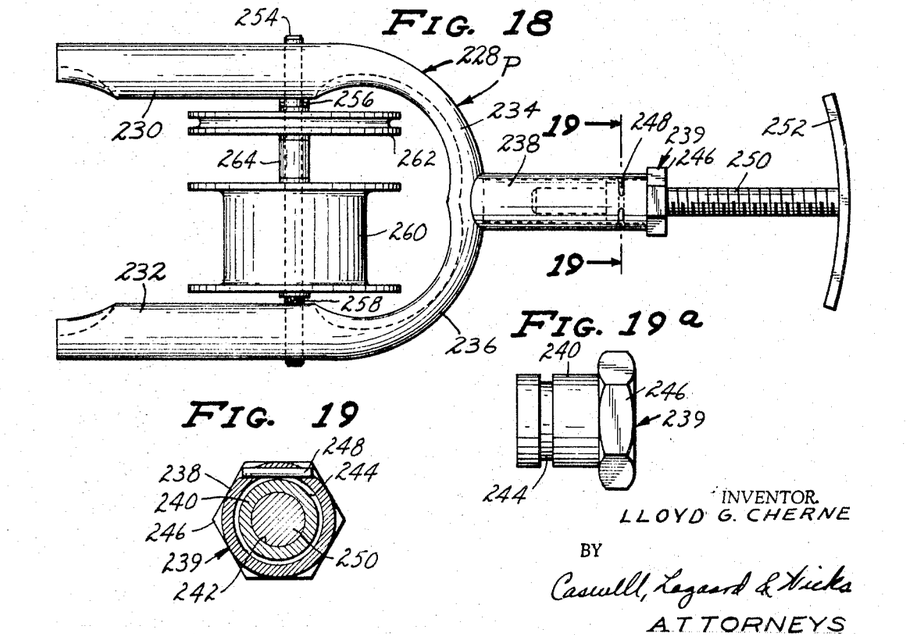
FIGURE 18 is a top plan view of the pulley mount of FIGURE 17.
FIGURE 19 is a sectional view on the line 19—19 of FIGURE 18.
FIGURE 19a is a side elevational view of the threaded rod support of the pulley mount of FIGURES 18 and 19.

So that the hose unit H and the cable CC can be easily and effectively introduced into and withdrawn from the manhole M there is further provided in the manhole cover pulley unit P, FIGURES 17, 19 and 19a which includes the brace 228 formed of the spaced leg portions 230 and 232 each of which terminates at the inner end thereof in the inner arcuate portion 234 and 236, respectively, the portions 234 and 236 joined thereby forming a yoke. The outer ends of the legs 230 and 232 form spaced contacts for engagement with the frame F of the manhole thereby providing stability. Extending from the juncture of the arcuate portions 234 and 236 is the tubular support 238 extending in parallel relation to the legs 230 and 232. The numeral 239 designates the threaded rod support and it includes the tubular body 240 formed with the threaded bore 242 and on the surface of the body the annular groove 244. Formed on the outer end of the body 240 is the hexagonal formation 246. The outside diameter of the body 240 is substantially that of the inside diameter of the tubular support 238, thereby allowing the rod support to be positioned within the tubular support 238. The rod support 239 is rotatably maintained in the support 238 by means of the pin 248 extending through and secured within the wall of the tubular support, the pin 248 positioned within the groove 244 of rod support 239. Thus with the pin 248 in groove 244 the support 239 is rotatably mounted against longitudinal displacement in the tubular support 238. The threaded rod 250 is threadedly engaged with the threaded bore of rod support 239 and formed on the outer end of the rod 250 is the arcuate bar 252.

Mounted on and extending between the legs 230 and 232 of the unit P is the shaft 254 which is prevented from displacement by the short pins 256 and 258 extended therethrough at a point inside the legs 232 and 230 respectively. The numeral 260 designates a first pulley which is free running and for the hose H rotatably mounted on the shaft 254, and further mounted on the shaft 254 is the second pulley 262 which is free running and for the cable CC. The pulley 262 is spaced from pulley 260 by means of the collar 264.

In use the manhole cover pulley unit P is positioned in the circular manhole frame F with the outer ends of the legs 230 and 232 in contact with the inner edge of the frame F and the bar 252 in contact with the inner edge of the frame F. The hexagonal portion 246 of the rod support is then grasped and rotated whereby the contact pressure of the bar 252 and legs 230 and 232 upon the frame F is increased, thereby securely mounting the pulley unit P in the frame. With the unit P in position, the hose unit H and the cable CC are effectively and easily introduced and guided into the manhole M over the pulley 260 and the pulley 262, respectively, and removed from the manhole without complications or wear on the hose H and cable CC.

The air hose unit H and cable CC are placed in the manhole M upon the unit P, FIGURE 1 and at the bottom of the manhole the hose unit and the cable CC are introduced into the sewer pipe S. To facilitate the passage of the hose unit H and cable CC between the manhole and the sewer pipe the manhole jack J is provided. The jack J includes the tubular main arm portion 266 which terminates at one end in the right angularly disposed short arm portion 268. Secured to the outer end of the short arm portion 268 is the bar 270 positioned transversely thereof. The short arm 268 is strengthened by means of the brace 272 connected to the short arm and the main arm portion 266. The numeral 274 designates a shaft which is secured to the main arm portion and extending therethrough normal to the longitudinal axis thereof in close spaced relation to the short arm 268. Rotatably mounted on one end of the shaft 274 is the free running grooved pulley 276 for cable CC and rotatably mounted on the other end of the shaft is the free running grooved pulley 278 for hose unit H. The pulleys 276 and 278 are rotatable independently.

Figure 20:
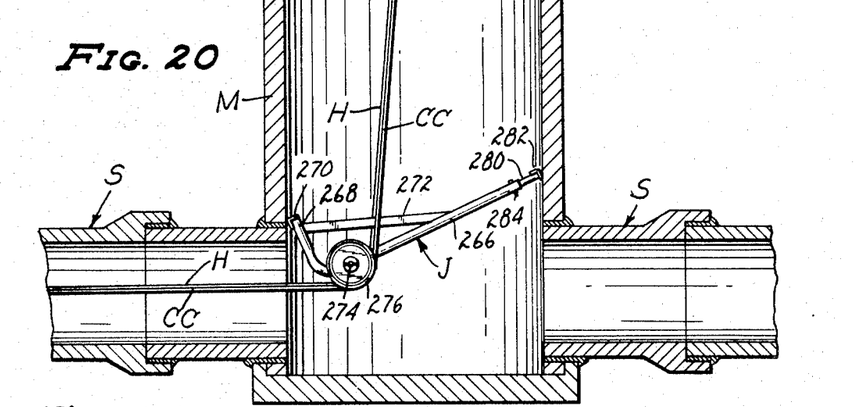
FIGURE 20 is a side elevational view of a pulley jack shown in operative positive in a sewer manhole.
Figures 21, 22:
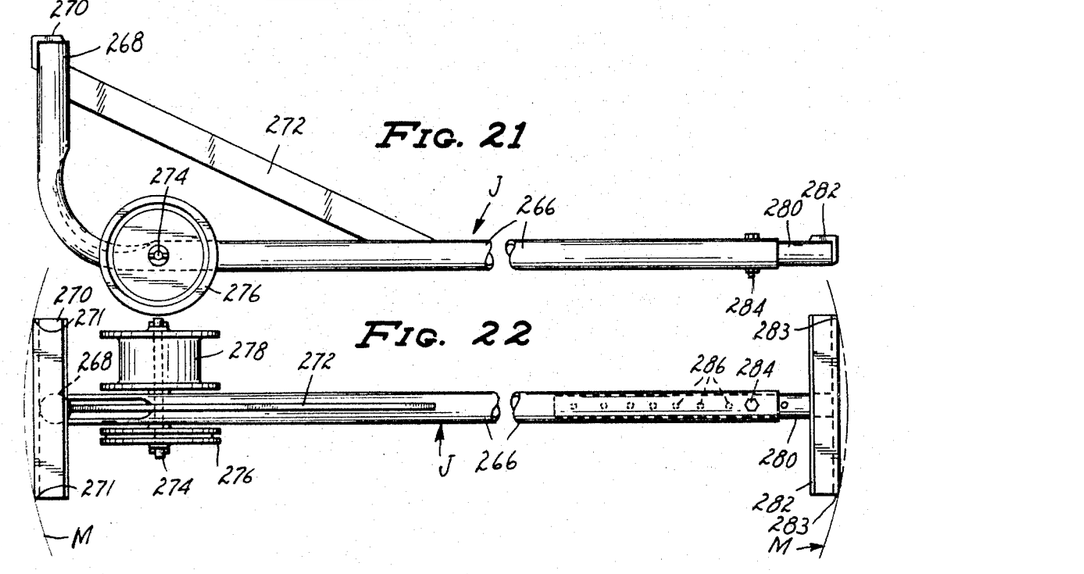
FIGURE 21 is a side elevational view of the pulley jack shown in FIGURE 20.
FIGURE 22 is a top plan view of the pulley jack shown in FIGURES 1, 20 and 21.
Figure 23:
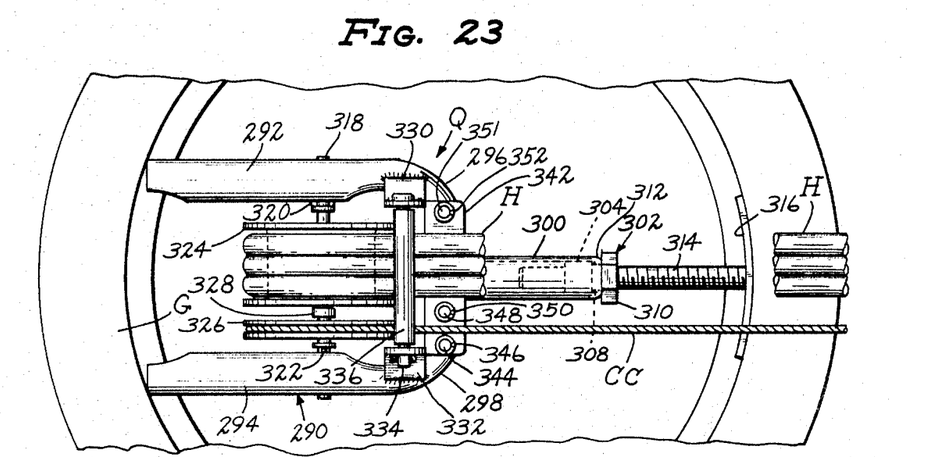
Figure 24:
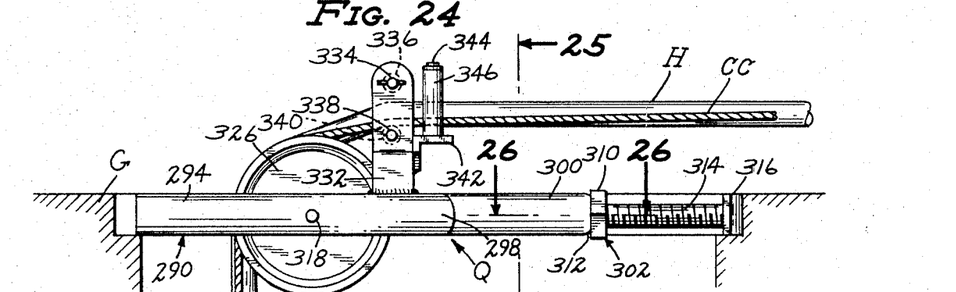
FIGURE 24 is a side elevational view of the pulley mount shown in FIGURE 23.
Figures 25, 26:
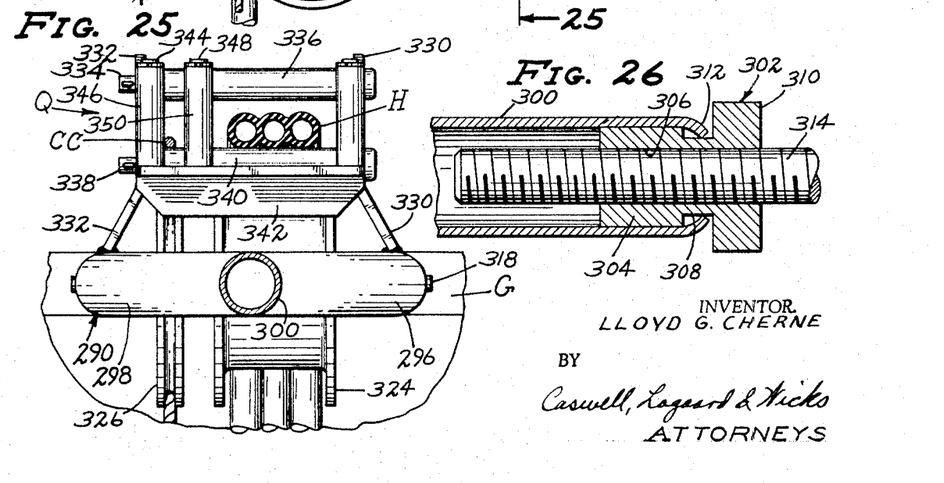
FIGURE 25 is a sectional view on the line 25—25 of FIGURE 24.
FIGURE 26 is a sectional view on the line 26—26 of FIGURE 24.

Further provided is the tubular extension arm portion 280 which slidably fits into the outer end of the tubular main arm portion 266. A bar 282 is secured to the outer end of the extension 280 at right angles thereto. The extension arm portion 280 is adjustably positioned with regard to the main arm portion 266 by means of the pin 284 mounted in opposed holes formed in the arm 266, the pin being positioned in any one of several spaced holes 286 formed through the extension arm 280. It will be seen that with the short arm portion 268 extended at a right angle to the main arm portion a progressive jamming of the jack into the manhole is possible. In use the jack J is adjusted and positioned loosely in the manhole M as in FIGURE 20 with the bar 270 against the wall of the manhole and the bar 282 also against the manhole wall. The jack is then jammed tightly into the wall surfaces of the manhole. The jack J is positioned so that the pulleys 276 and 278 are substantially opposite the entrance of the sewer pipe S into the manhole. With the jack J in operative position, the air hose unit H and the cable CC are easily and positively passed into and out of the sewer pipe S from the manhole M in proper alignment. It will be seen that the outer corner edges 271 of the bar 270 provide a positive "biting" engagement with the wall of the manhole. Similarly the outer corner edges 283 of the bar 282 provide a positive "biting" engagement with the wall of the manhole.

OPERATION

Figures 4, 5:
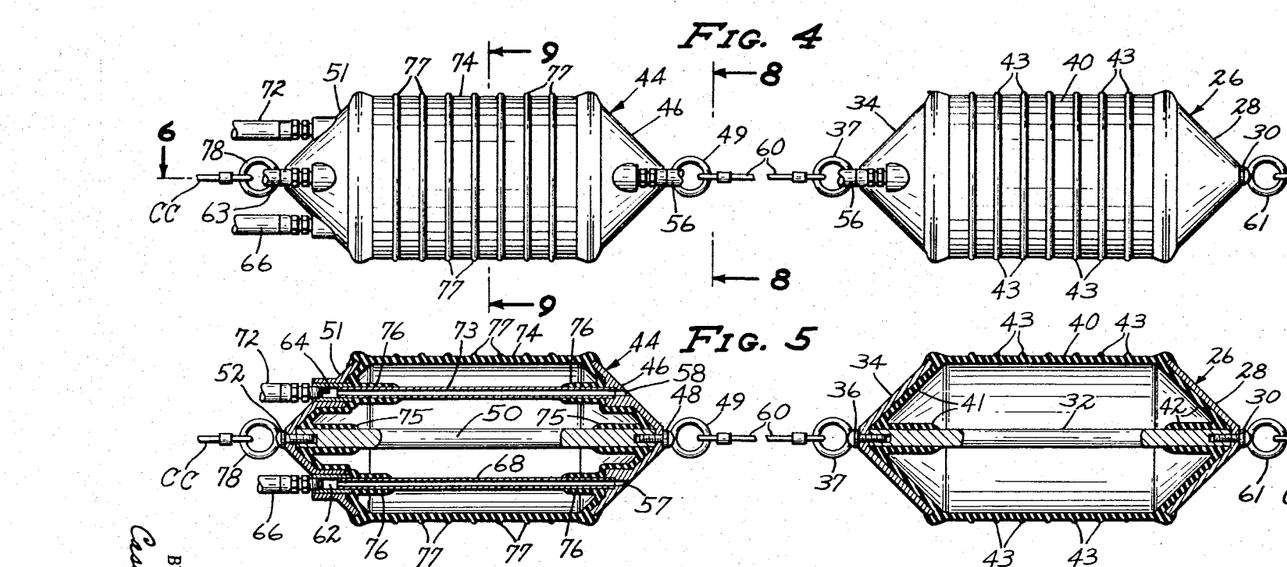
FIGURE 4 is side elevational view of the pair of inflatable ball members.
FIGURE 5 is a longitudinal sectional view of the pair of ball members on the line 5—5 of FIGURE 7.
Figure 6:
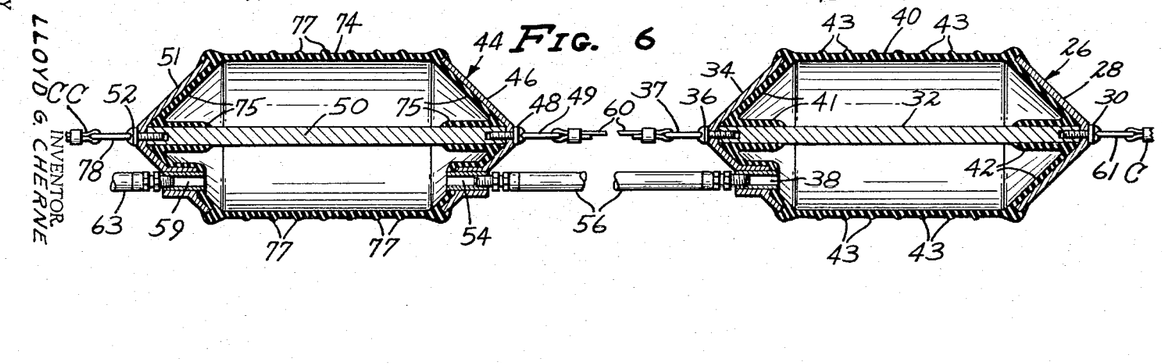
FIGURE 6 is a longitudinal sectional view of the pair of ball members on the line 6—6 of FIGURE 4.
Figure 7:
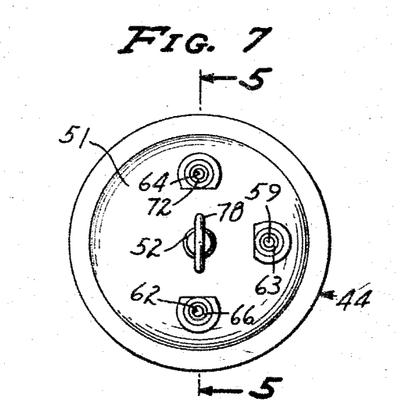
FIGURE 7 is an elevational view of one end of a first inflatable ball.
Figure 8:
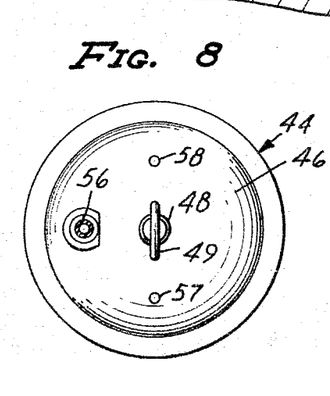
FIGURE 8 is an end view of the first ball of FIGURE 7 on the line 8—8 of FIGURE 6.
Figure 9:
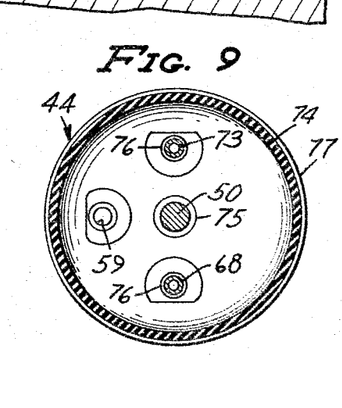
FIGURE 9 is a sectional view on the line 9—9 of FIGURE 4.

Let it be assumed that the sewer pipe S is to be tested for a possible leak between manhole M and manhole MM and more particularly between point "X" and point "Y," FIGURE 1. An air operated tractor (not shown) of a size to move within the pipe S is moved into the manhole M to a point where S enters the manhole. The air tractor is propelled by an air supply line connected thereto which is dragged with the tractor. An air line for the tractor may be connected to outlet 208. A line such as C is connected to the air tractor and dragged along with the tractor to manhole MM. The line C is then attached to the ring 61 of the ball 26 and the uninflated balls 26 and 44 positioned in the pipe S, the balls connected up as illustrated in FIGURES 4, 5 and 6 and also FIGURE 1. The line CC is connected to the ring 78 of ball 44 and the lines of the hose unit H are connected to the ball 44. The hose unit H is positioned on the pulley 278 of the jack J and upwardly over the pulley 260 of the pulley unit P. The cable CC is positioned on the pulley 276 of the jack J and upwardly over the pulley 262 of the pulley unit P. A supply of hose unit H is wound on the reel R and it is connected to the panel PP in the manner hereinbefore described.

The line C is passed over a pulley of a jack J positioned in the manhole MM and up through the manhole MM to the reel O, FIGURE 1. The line C is pulled and reeled in so as to pull the deflated balls 26 and 44 through the sewer S to the position shown in FIGURE 1, the line CC and hose unit paying off of reels RR and R respectively. With balls 26 and 44 in place as in FIGURE 1 the testing is done as follows. The balls 26 and 24 are inflated simultaneously by means of line 63 connected to ball 44 and line 56 connecting the interiors of both balls as heretofore set forth. Line 63 takes off from reel R as 63a and is connected to air outlet 208. Valve 200 is opened thereby pressurizing lines 63 and 63a and as a result the balls are inflated, thus sealing off the section of sewer pipe S between the balls as in FIGURE 1. Valve 200 is then closed, and the amount of pressure created in the balls is measured by reference to air gauge 202 to check proper inflation.

With the balls 26 and 44 inflated, the sewer pipe between the balls is pressurized by means of line 66 connected to ball 44 and line 66 takes off of reel R as line 66a and is connected to air outlet 220 as described. Air valve 218 is opened which pressurizes the sewer pipe between balls 26 and 44. The amount of pressure created in the sewer pipe S between the balls is read on the gauge 224. Valve 218 is then closed. Pressure reading of the pipe S is accomplished through line 72a, line 72 and conduit 73 and opening 58 of ball 44. With, for example, an eight inch sewer pipe S, the same is pressurized at three p.s.i. and the timer 226 set at four minutes. At the expiration of four minutes on the timer the gauge 224 is consulted, and if there is a drop in pressure of more than one pound, there is a sufficient enough leak which requires repair. If there is less than a one pound drop in pressure, it has been found by experiment that the leak is of such an insufficient or negligible nature that repair is not required.

If a leak is suspected somewhere between manhole M and manhole MM, the line 60 connecting the balls 26 and 44 is made long enough to place ball 26 adjacent manhole MM and ball 44 adjacent manhole M with the entire length of the sewer pipe S between the balls tested. If a sufficient drop in pressure is found in the test then segments of the pipe S are tested as described above to localize the leak.

Referring to FIGURES 23–26, a further embodiment of the manhole cover pulley unit P, there is formed the unit Q which includes the brace 290 formed of the spaced leg portions 292 and 294 each of which terminates at the inner end thereof in the inner arcuate portion 296 and 298, respectively, the portions 296 and 298 joined thereby forming a yoke. The outer ends of the legs 296 and 298 form spaced contacts for engagement with the frame G of the manhole thereby providing stability.

Extending from the juncture of the arcuate portions 296 and 298 is the tubular support 300 extending in parallel relation to the legs 292 and 294. The numeral 302 designates the threaded rod support, and it includes the tubular body 304 formed with the threaded bore 306, the annular recess 308 and hexagonal head portion 310. The body 304 is of a diameter substantially that of the inside diameter of the tubular support 300 and is rotatably held therein by means of the crimped shoulder 312 of support 300 extending into the recess 308. The threaded rod 314 is threadedly engaged in the threaded bore 306 of the support 300. Formed on the outer end of rod 314 is the arcuate bar 316.

Mounted on and extending between the legs 292 and 294 of the unit Q is the shaft 318 which is prevented from displacement by the short pins 320 and 322 extended therethrough at a point inside the legs 292 and 294, respectively. The numeral 324 designates a first pulley which is free running on the shaft 318 for the hose H, and further mounted on the shaft 318 is the second pulley 326 which is running and for the cable CC. The pulley 324 is spaced from the pulley 326 by means of the collar 328.

Further provided is the first upright support bracket 330 secured at its lower end to the leg 292 and a second upright support 332 secured at its lower end to the leg 294. Mounted on the upper portions of the supports 330 and 332 is the upper horizontal shaft 334 and freely rotatable thereon is the upper roller sleeve 336. Also mounted on the supports 330 and 332 is the lower horizontal shaft 338 spaced from upper shaft 334 and freely rotatable thereon is the lower roller sleeve 340.

The numeral 342 designates a horizontal support which is connected at its ends to the upright supports 330 and 332 substantially in vertical alignment with shaft 338 and below the upper surface of lower roller sleeve 340. Secured to the horizontal support 342 at the lower end is the vertical pin 344 on which is rotatably mounted the first roller sleeve 346. Also secured to the horizontal support 342 at the lower end is the vertical pin 348 spaced from pin 344 and on which is rotatably mounted the second roller sleeve 350. Further provided is the vertical pin 351 secured at its lower end to the support 342 and on which is rotatably mounted the third roller sleeve 352, the pin 351 spaced from the pin 348.

The pins 344 and 348 are spaced sufficiently to allow the cable CC to pass therebetween and be guided by the rollers 346 and 350. The pin 351 is spaced from pin 348 whereby the hose H will pass between and be guided by the rollers 350 and 352.

In use the manhole cover pulley unit Q is positioned in the circular manhole frame G with the outer ends of the legs 292 and 294 in contact with the inner edge of the frame G and the bar 316 in contact with the inner edge of the frame G. The hexagonal portion 310 of the rod support is then rotated whereby the contact pressure of bar 316 is increased to securely mount the pulley unit Q in the frame G. With the unit Q in position, the hose unit H and the cable CC are effectively and easily introduced and guided into the manhole G over pulley 324 and pulley 326, respectively, and withdrawn from the manhole without complications or wear on the hose H and the cable CC. Further, the horizontal guide rollers 336 and 340 maintain the hose H on the pulley 324 by the prevention of vertical displacement therefrom, and the vertical guide rollers prevent horizontal displacement of the hose H off the pulley 324 while allowing free movement of the hose due to the rollers guiding movement.

The horizontal guide rollers 336 and 340 also prevent the cable CC from vertical displacement off the pulley 326, and the vertical rollers 346 together with the vertical roller 350 prevent horizontal displacement of the cable off the pulley 326 while allowing free movement of the hose due to the roller guiding movement.

The invention is not to be understood as restricted to the details set forth since these may be modified without departing from the spirit and scope of the invention.

Having thus described the invention, what is claimed as new and desired to be secured by Letters Patent is:

1. A mechanism for pressure testing installed sewer pipe comprising:
   (a) a first and a second inflatable ball member,
   (b) first conduit means extending through said second ball member,
   (c) second conduit means extending through said second ball member,
   (d) tubing means connecting the interiors of said balls for inflating said first and second ball members positioned in spaced relationship within a sewer pipe,
   (e) means in connection with said first conduit means for pressurizing the area in a sewer pipe between said first and second ball members having inflated sealing contact with the sewer pipe through said first conduit means and,
   (f) means connected to said second conduit means for reading the air pressure existing in the sewer pipe between said ball members.

2. The mechanism of claim 1 further characterized by:
   (a) each of said balls having a hollow cylindrical flexible body connected to end members.

3. The mechanism of claim 2 further characterized by:
   (a) said first conduit means including a tubular member extending through said cylindrical ball body and said end members.

4. The mechanism of claim 3 further characterized by:
   (a) said second conduit means including a tubular member extending through said cylindrical ball body and said end members.

5. The mechanism of claim 1 further characterized by:
   (a) said pressure reading means including an air line connected to said second conduit means of said second ball member.

6. The mechanism of claim 1 further characterized by:
   (a) said sewer pipe pressurizing means including an air pressure line connected to said first conduit means of said second ball member.

References Cited

UNITED STATES PATENTS

| | | | |
|---|---|---|---|
| 2,192,155 | 2/1940 | Schuldt | 73—40.5 |
| 2,273,984 | 2/1942 | Osborn. | |
| 2,299,116 | 10/1942 | Svirsky. | |
| 2,975,637 | 3/1961 | Burdick | 73—40.5 XR |
| 3,035,440 | 5/1962 | Reed | 73—40.5 XR |

LOUIS R. PRINCE, *Primary Examiner.*

J. NOLTON, *Assistant Examiner.*

Disclaimer and Dedication 3,453,869.—*Lloyd G. Cherne*, Minneapolis, Minn. MECHANISM FOR PRESSURE TESTING INSTALLED SEWER PIPE FOR LEAKS. Patent dated July 8, 1969. Disclaimer and Dedication filed Mar. 10, 1978, by the assignee, *Cherne Industrial, Inc.*

Hereby disclaims and dedicates to the Public the entire remaining term of said patent.

[*Official Gazette May 23, 1978.*]